(12) United States Patent
Lau

(10) Patent No.: US 10,292,345 B2
(45) Date of Patent: May 21, 2019

(54) PLANT WATERING SYSTEM

(71) Applicant: Ki Mau Lau, Kowloon (HK)

(72) Inventor: Ki Mau Lau, Kowloon (HK)

( * ) Notice: Subject to any disclaimer, the term of this patent is extended or adjusted under 35 U.S.C. 154(b) by 393 days.

(21) Appl. No.: 15/336,231

(22) Filed: Oct. 27, 2016

(65) Prior Publication Data

US 2017/0112081 A1    Apr. 27, 2017

(30) Foreign Application Priority Data

Oct. 27, 2015    (GB) .................................. 1518932.7

(51) Int. Cl.
*A01G 27/06*    (2006.01)
(52) U.S. Cl.
CPC .................................... *A01G 27/06* (2013.01)
(58) Field of Classification Search
CPC ................................ A01G 27/06; A01G 27/04
See application file for complete search history.

(56) References Cited

U.S. PATENT DOCUMENTS

| | | | |
|---|---|---|---|
| 3,261,125 A * | 7/1966 | Arkebauer | A01G 27/04 137/78.3 |
| 4,184,287 A * | 1/1980 | Roth | A01G 27/04 47/81 |
| 4,236,352 A * | 12/1980 | Heaney | A01G 27/04 119/246 |
| 4,843,758 A * | 7/1989 | Raczkowski | A01G 27/005 47/48.5 |
| 4,999,947 A * | 3/1991 | Whitaker | A01G 27/04 47/81 |
| 7,997,294 B2 * | 8/2011 | Murray | A01G 25/167 137/78.3 |
| 2009/0007486 A1 * | 1/2009 | Corradi | A01G 31/02 47/62 R |

FOREIGN PATENT DOCUMENTS

| | | |
|---|---|---|
| DE | 202010010408 | 12/2011 |
| FR | 2595535 | 3/1986 |
| GB | 1504436 | 3/1978 |
| WO | 9736474 | 10/1997 |
| WO | 2007002976 | 1/2007 |

OTHER PUBLICATIONS

United Kingdom Intellectual Property Office; Combined Search and Examination Report; dated Apr. 6, 2016.

\* cited by examiner

*Primary Examiner* — Monica L Williams
(74) *Attorney, Agent, or Firm* — Price Heneveld LLP

(57) ABSTRACT

A plant watering system includes a reservoir, a plant growth container located adjacent the reservoir, the reservoir having a water level in use below the container, one or more channels communicating between the reservoir and container, and a closing member for each channel movable between a lower open position and an upper closed position, wherein in the open position water in the reservoir may pass into the container to moisten a plant growth medium contained in the container and wherein, in the closed position the passage of water is prevented.

13 Claims, 2 Drawing Sheets

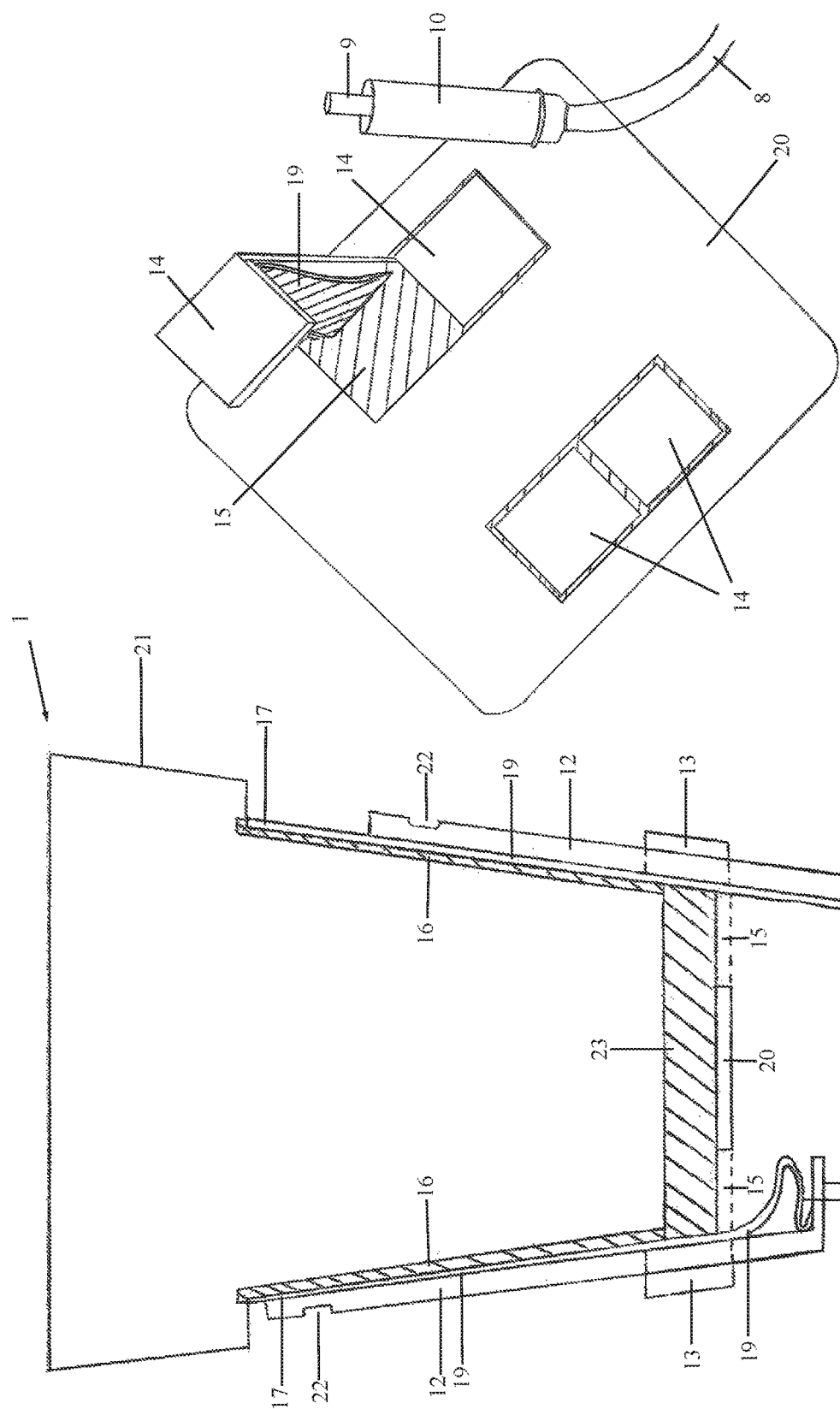

PLANT WATERING SYSTEM

BACKGROUND OF THE INVENTION

This invention relates to a watering system for a plant growth container particularly but not exclusively of the kind used for cultivation of a plant in a greenhouse or domestic environment in which a regular supply of water is required without a need for manual watering, especially wherein a connection to a mains water supply is not possible.

SUMMARY OF THE INVENTION

According to the present invention a plant watering system comprises:
a reservoir;
a plant growth container located adjacent the reservoir, the reservoir having a water level in use below the container;
one or more channels communicating between the reservoir and container;
a closing member for each channel movable between a lower open position and an upper closed position, wherein in the open position water in the reservoir may pass into the container to moisten a plant growth medium contained in the container and wherein, in the closed position the passage of water is prevented.

The system may further comprise a storage vessel arranged to supply a constant head of water to the reservoir, so that the water level in the reservoir remains constant in use. The storage vessel may comprise a closed tank, having a water outlet and an air inlet, the water outlet communicating with the reservoir and the air inlet having an opening in the reservoir located at a level wherein the opening is closed by a maximum water level in the reservoir; preventing a further flow of water from the storage vessel into the reservoir.

The or each channel may be arranged so that water passes from the reservoir into the container by capillary action.

Preferably a water absorbent material is provided in the channel. The absorbent material may comprise a wick, for example a textile web or fibrous web or other bibulous material, for example an open celled polymeric or sponge material. The wick may comprise an elongate web.

Use of a wick is preferred in order to provide a constant and controllable flow of water at a sufficient rate to moisten but not to flood the plant growth material.

In a preferred embodiment the, or each closing member may have an elongate support portion arranged to support an elongate water absorbent member or wick, so that in the lower position the lower part of the wick is immersed in water contained in the reservoir and so that an upper part of the wick is located in the interior of the container to contact a plant growth medium located therein.

The members are preferably independently closeable.

A locking arrangement may be provided, for example an overcentre latch or click stop arrangement.

The container may have an aperture in a lower part thereof, the absorbent member or wick extending through the aperture.

Absorbent or bibulous pads may be provided on the interior of the container in communication with the wicks to facilitate homogenous distribution of water throughout the growth medium. The absorbent pads may be located on the sides and the base of the container. Preferably the absorbent pad extends upwardly from the bottom of the container.

The closing member may include a cap configured to close the aperture when the closing member is in the upper position.

In a preferred embodiment the closing member comprises a generally upwardly extending elongate support and a generally horizontal cap; the cap having an upwardly facing surface upon which the wick may be stowed and preferably folded, as the closing member is raised.

The absorbent members may comprise woven or knitted tapes configured to allow folding on the upper surface of the cap when the cap is raised to an upper position. The tapes may be creased to facilitate folding and unfolding as the cap is raised and lowered.

In the preferred embodiment the closing member may comprise a slider located for slidable movement in a guideway on the exterior of the container to raise and lower a lower part of the wick; an upper part of the wick extending adjacent an inner surface of the container.

In use of the watering system a plant growth material, for example compost or soil, and one or more plants are potted in the container. The water supply from the tank is connected, so that the reservoir fills to a predetermined level dependent on the level of the opening of the pipe from the tank. One or more closing members may then be lowered so that the absorbent member contacts the water in the reservoir to allow water to flow by capillary action upwardly into the container.

Preferably two or more channels and closing members are provided. Use of a plurality of channels and independently closeable members allows control of the rate of water flow into the container.

The absorbent members may be impregnated with a fertilizer or other agrochemical to allow controlled release of the agrochemical into the water supplied to the container.

BRIEF DESCRIPTION OF THE DRAWINGS

The invention is further described by means of example, but not in any limitative sense, with reference to the accompanying drawings of which:

FIG. 2 is a cross sectional view of the plant growth container; and

FIG. 3 shows the underside of the plant growth container shown in FIG. 2.

DETAILED DESCRIPTION OF THE PREFERRED EMBODIMENTS

Figure 1:
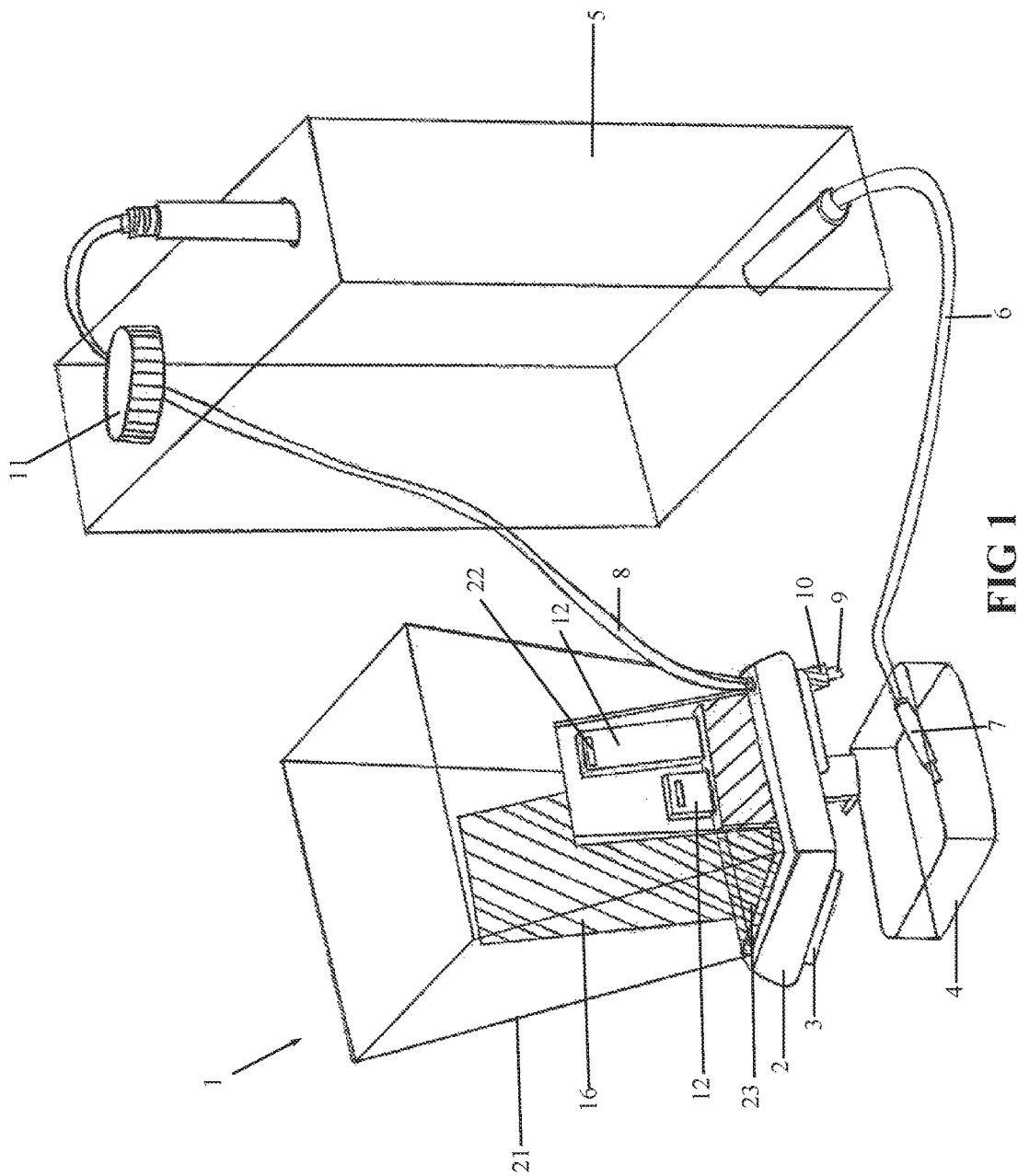
FIG. 1 shows a plant watering system in accordance with the present invention.

The plant watering system shown in FIG. 1 comprises an upwardly opening container (1) having a side wall (21) and a bottom portion (20), mounted on a base (2). The base (2) has downwardly extending flanges (3) adapted to engage the upper rim of an upwardly opening reservoir (4) to form an enclosure. A tank (5) is connected by a water supply tube (6) to an inlet (7) located in the reservoir (4). An air tube (8) is connected at one end to an upper region of the tank (5) and at another end to an inlet (9) engaged in a mounting (10) extending downwardly from the base (2) towards the reservoir (4). The mounting may comprise a hollow sleeve through which the tube may slide upwardly or downwardly.

The height of the inlet (9) may be adjusted so that the inlet is located at a desired water level. In use the flow of the water from the tank (5) into the reservoir (4) is stopped when the inlet (9) is closed by the rising water surface in the reservoir. The tank (5) is closed by a screw cap (11) permitting the tank to be filled as necessary.

Closing members comprising elongate supports (12) are mounted for upward and downward sliding movement in guideways (13) located on the exterior of the container (1). The elongate supports have inwardly extending caps (14) configured to be received in correspondingly shaped rebates (15) which form apertures in the bottom portion (20) of the container. The supports have finger grips (22) to facilitate raising and lowering of the supports in use. An absorbent mat (23) is disposed in the bottom of the container (1). The apertures (15) in the bottom portion (20) communicate between the reservoir and the interior of the container. A water absorbent wick (19) extends downwardly from an upper location (17) within the container (1) to a lower location (18) wherein the wick rests on the upper surface of cap (14). Absorbent pads (16) are located in contact with the wicks (19) and line the inner wall of container (1) so that water carried from the reservoir by the wicks (19) is made available for uniform absorption by a growth medium in the container. As the elongate member (12) and cap (14) are raised the wick may become folded onto the upper surface of the cap as shown at (19) in FIG. 2.

When a closing member is in the upper position as shown in FIG. 3, the aperture is closed preventing any flow of water along the wick from the reservoir and through the aperture to the container.

In use of the apparatus, one or more of the elongate supports may be moved downwardly so that the closing members are disengaged from the base to open a respective aperture (15). This allows the absorbent wick (19) to contact water within the reservoir.

The rate of passage of water from the reservoir into the container and thereby into the plant growth medium may be controlled by changing the number of wicks (19) which are lowered into contact with the water in the reservoir. When in the closed position the wicks are removed from the water supply to prevent passage of water along the wick to the absorbent member by capillary action.

The invention claimed is:

1. A plant watering system, comprising:
   a reservoir;
   a plant growth container located adjacent the reservoir, the reservoir having a water level in use below the container;
   absorbent pads extending upwardly from the bottom of the container and located on a side wall and base of the container;
   one or more channels communicating between the reservoir and container;
   a water absorbent material being provided in the or each channel, the water absorbent material comprising a wick, wherein the absorbent material is in communication with the absorbent pads on the side wall and base of the container; and
   a closing member for each channel movable between a lower open position and an upper closed position, wherein in the open position water in the reservoir may pass into the container to moisten a plant growth medium contained in the container and wherein, in the closed position the passage of water is prevented.

2. The plant watering system as claimed in claim 1, further comprising:
   a storage vessel arranged to supply a constant head of water to the reservoir.

3. The plant watering system as claimed in claim 2, wherein the storage vessel includes a closed tank having a water outlet and an air inlet, the water outlet communicating with the reservoir and the air inlet having an opening in the reservoir located at a level wherein the opening is closed by a maximum water level in the reservoir, preventing the flow of water from the storage vessel into the reservoir.

4. The plant watering system as claimed in claim 3, wherein the height of the opening of the air inlet in the reservoir is adjustable.

5. The plant watering system as claimed in claim 1, wherein water passes from the reservoir into the container by capillary action.

6. The plant watering system as claimed in claim 1, wherein the wick includes an elongate web.

7. The plant watering system as claimed in claim 1, wherein the closing member has an elongate support portion, arranged to support the elongate water absorbent member so that in the lower position, the lower part of the wick is immersed in water contained in the reservoir, and so that an upper part of the wick is located in the interior of the container to directly and indirectly contact a plant growth medium located therein.

8. The plant watering system as claimed in claim 1, wherein the container includes an aperture in a lower part thereof, the wick extending through the aperture.

9. The plant watering system as claimed in claim 8, wherein the closing member includes a cap configured to close the aperture when the closing member is in the upper position.

10. The plant watering system as claimed in claim 1, wherein the closing member comprises a generally upwardly extending elongate support and a generally horizontal cap, the cap having an upwardly facing surface upon which the wick may be stowed as the closing member is raised.

11. The plant watering system as claimed in claim 1, wherein the absorbent wicks comprise at least one of woven and knitted tapes.

12. The plant watering system as claimed in claim 1, wherein the closing member comprises a slider located for slideable movement in a guideway on the exterior of the container to raise and lower a lower part of the wick, the upper part of the wick extending adjacent an inner surface of the container.

13. The plant watering system as claimed in claim 1, further comprising:
   two or more channels and closing members.

* * * * *